United States Patent

Bott

[15] 3,643,973
[45] Feb. 22, 1972

[54] SLIDING TIEDOWN DEVICE

[72] Inventor: John A. Bott, 931 Lake Shore Drive, Grosse Pointe Shores, Mich. 48236

[22] Filed: Apr. 22, 1970

[21] Appl. No.: 30,665

[52] U.S. Cl. .......................................................280/179 R
[51] Int. Cl.............................................................B60p 7/00
[58] Field of Search ...............280/179 R, 179 A; 105/369 A; 151/41, 71; 85/1 H; 248/316 R, 316 A, 119 R, 245

[56] References Cited

UNITED STATES PATENTS 3,351,356  11/1967  Clark et al. ..............................280/179
2,688,289  9/1954  Sterling..............................105/369 A
2,688,504  9/1954  Parker ................................105/369 A

*Primary Examiner*—Kenneth H. Betts
*Assistant Examiner*—Robert R. Song
*Attorney*—Harness, Dickey & Pierce

[57] ABSTRACT

A slidable tiedown device for an automobile vehicle such as a pickup truck. A pair of channel members are mounted on the sidewalls of the truck bed and serve as mounts for one or more pairs of tiedown members. The tiedown members are slidable along the length of the channel members and may be locked in any desired position thereon by an internally threaded collar, nut or the like. The tiedown members have eyelet openings adapted to receive a rope or the like.

3 Claims, 5 Drawing Figures

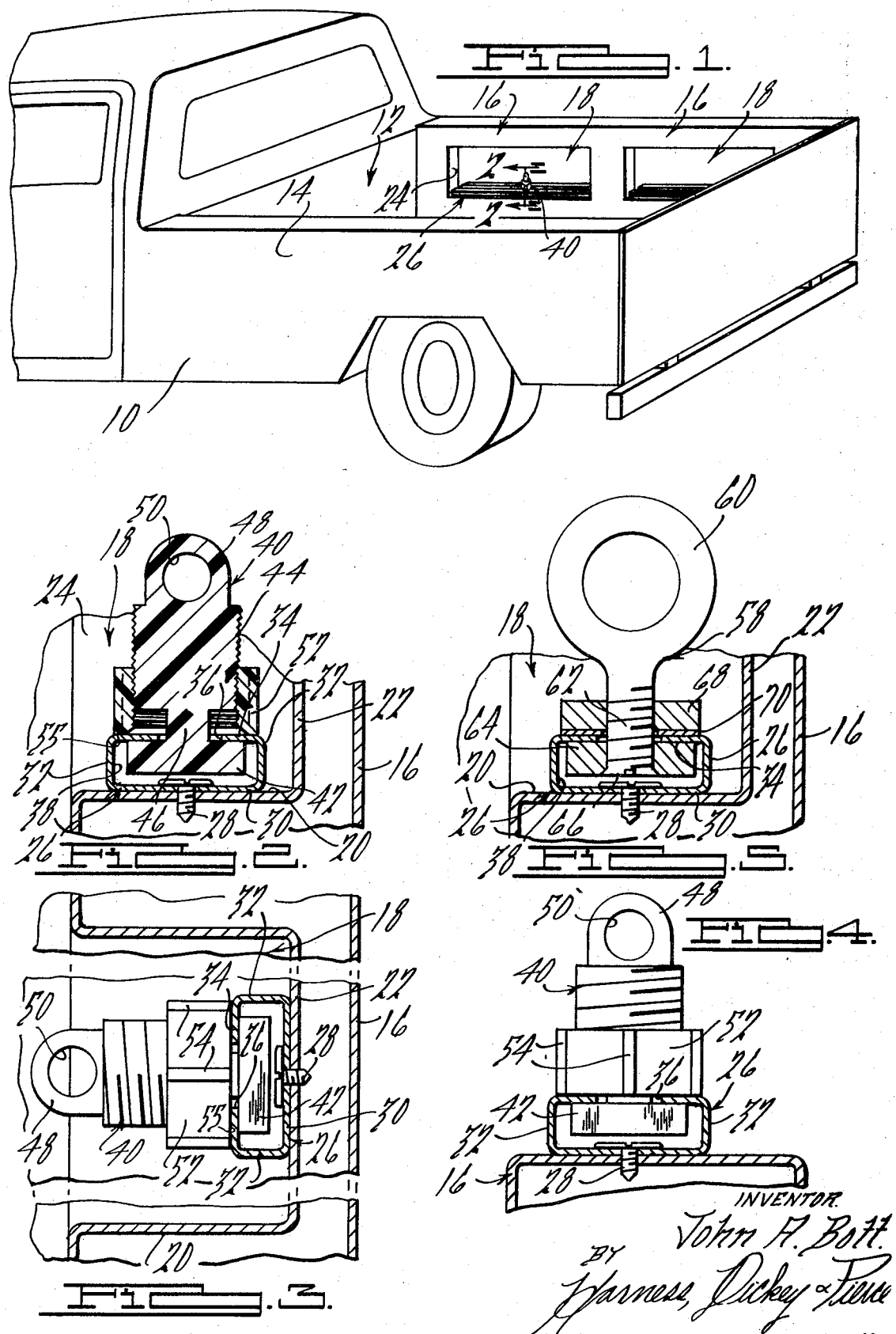

SLIDING TIEDOWN DEVICE

SUMMARY OF THE INVENTION

Pickup trucks and similar automotive vehicles have not ordinarily provided anchors or the like to which a rope can be secured in order to tie down cargo on the bed of the truck. When rope has been used to secure an object in place on the truck bed, it is ordinarily tied down in different locations not specifically intended for that purposes. The device of the present invention is specifically designed as an adjustable tiedown or anchor and may be installed conveniently on the side walls or in other locations on the truck. Among the objects of the present invention are the provision of a tiedown device which is inexpensive to manufacture, easy to install, strong, compact in size and convenient to use. The tiedown device of the present invention is distinguished by its use of an elongated channel member within which the tiedown device is slidable and the provision of a locking collar, nut or the like which may be turned to secure the tiedown device in any selected location along the channel.

DESCRIPTION OF THE VIEWS OF THE DRAWINGS

FIG. 1 is a perspective view of a pickup truck having mounted thereon a tiedown device constructed in accordance with the principles of the present invention;

FIG. 2 is a sectional view of the structure illustrated in FIG. 1, taken along the line 2–2 thereof;

FIGS. 3 and 4 are sectional views of the tiedown device of FIG. 2, showing alternative mounting locations for the device; and FIG. 5 is a view of a structure similarly illustrated in FIG. 2, showing a modified form of the invention.

DESCRIPTION OF THE PREFERRED EMBODIMENTS

FIG. 1 illustrates a pickup truck 10 having a bed area 12 provided with a pair of spaced sidewalls 14 and 16. Each of the sidewalls 14 and 16 have recesses 18 open to the cargo compartment or bed area 12. Each recess 18 is formed with a bottom wall 20, an inner wall 22 and end walls 24. FIG. 2 illustrates an elongated channel member 26 mounted on the recess wall 20 by means of sheet metal screws 28. The channel member 26 is of uniform cross-sectional shape and includes a bottom wall 30, a pair of sidewalls 32 and a top wall 34. The top wall 34 is formed with a slot 36 extending down the middle thereof and providing communication from the outside of the device to a channel 38 formed between said channel member walls. The channel member 26 serves as a mounting for a tiedown member or anchor 40.

The tiedown member 40 includes a guide portion 42 positioned within the channel 38 and an externally threaded portion 44 positioned exteriorly of the channel member 26. A thin connecting portion 46 of the tiedown member 40 extends through the slot 36 between the guide portion 42 and the threaded portion 44. An eyelet or rope-receiving portion 48 having a circular opening 50 extending transversely therethrough is positioned at the opposite end of the tiedown member 40 from the guide member 42. It will be noted that the eyelet portion 48 has a maximum width less than the thread diameter of the threaded portion 44.

The threaded portion 44 of the tiedown device 40 receives an internally threaded collar 52 having external ribs 5 to facilitate the manual rotation thereof. An end wall 54 of the collar 52 is abuttable with the exterior surface of the channel wall 34. Upon tightening of the collar 52 against the wall 34 the wall 34 will be clamped between the guide portion 42 and the collar 52. When the collar 52 is loosened, the entire tiedown device 40 may be slid longitudinally along the length the channel member 26. Thus, the collar 52 may be tightened to lock the tiedown member 40 in any desired position.

As illustrated in FIG. 2, the tiedown member 40 consists of a unitary plastic molding. Similarly, the collar 52 is illustrated as a one-piece plastic molding. It will be appreciated, however, that the tiedown member 40 may be made from other materials or could be made of several parts. One desirable feature of the embodiment of FIG. 2, however, is the fact that the eyelet portion 48 is so dimensioned that the collar 52 may be passed over it in order to be threaded onto the threaded portion 44. This permits the guide portion 42 to be of a relatively large size. In this connection, it will be seen that the width of the guide portion 42 (in a direction extending between the walls 32) is greater than the width of the slot 36. This, of course, is necessary to prevent the tiedown member 40 from passing outwardly through the slot 36. It will be noted that the fit of the channel member 26 within the recess 18 provides an automatic closure for the opposite ends of the channel member 26. Thus, the tiedown member 40 is prevented from coming out of the channel 38 at the opposite ends thereof.

FIG. 3 illustrates an alternative mount of the channel 26 on the wall 22 of the recess 18. In this attitude, the tiedown member 40 extends horizontally toward the cargo area 12.

FIG. 4 illustrates still another mounting location for the channel member 26. In this embodiment, the channel member 26 is shown positioned on a wall 56 which defines the top surface of the sidewall 16 of the pickup truck. Of course, in this position the tiedown member 40 is oriented vertically and is entirely clear of the cargo area 12.

FIG. 5 illustrates a modified form of the invention wherein the channel member is positioned on the recess wall 20 as in the embodiment illustrated in FIG. 2. However, this form of the invention utilizes a tiedown member 58 in the form of an eye bolt having an eyelet portion 60 and a threaded shank portion 62. It will be seen that the eyelet portion 60 is of greater lateral dimension or width than the shank portion 62, which is threaded in the usual manner. The inner end of shank portion 62 has a nut 64 of square external cross-sectional shape positioned thereon and held against rotation on the shank 62 by staking of the shank portion as illustrated at 66. Positioned on the shank 62 prior to the installation and staking of the nut 64 is a clamping nut 68 of hexagonal cross-sectional shape and a washer 70. The clamping nut 68 can be rotated on the threaded shank 62 and performs a function similar to the threaded collar 52. When the adjusting collar 68 is loosened the entire tiedown device 58 may be slid the length of the channel member 26. However, when the nut 68 is tightened against the wall 34 of the channel member 26 the tiedown member 58 is clamped in a given position. The nut 68 is tightened by means of a standard wrench. The form of the invention illustrated in FIG. 5 possesses the advantage of an all metal or steel construction. Furthermore, the fact that a commercially available eye bolt is utilized for the tiedown member 58 reduces the overall cost of the device. As in the form of the invention illustrated in FIGS. 1–4 a rope or the like may be passed through the eyelet portion 60 whereby the device will anchor the rope.

What is claimed is:

1. In an automotive vehicle having a body provided with a wall, said body wall having a recess provided with end portions defining abutment surfaces, an elongated channel member positioned in said recess and having a channel and wall portion defining a slot extending along one side of said channel, an adjustable tiedown member extending through said slot, said tiedown member having a guide portion at one end thereof slidable in said channel, an eyelet portion at its opposite end provided with a transverse opening for receiving a rope or the like and a threaded portion intermediate said first two portions, and an internally threaded locking member threaded on said threaded portion and adapted to cooperate with said guide portion in clamping said wall portion therebetween to lock said tiedown member in selected positions along said channel member, said body wall abutment surfaces being operable to close the opposite ends of said channel and prevent movement of said tiedown member out of said channel.

2. In an automotive vehicle, an elongated channel member provided with a channel and a wall defining a slot along one side of said channel, an adjustable tiedown member extending through said slot, said tiedown member comprising a unitary resinous plastic molding having a guide portion at one end thereof slidable in said channel, an eyelet portion at its opposite end provided with a transverse opening for receiving a rope or the like and a threaded portion intermediate said first two portions, and threaded portion having a diameter greater than the maximum transverse diameter of said eyelet portion, and an internally threaded locking member operable to be passed over said eyelet and threaded over said eyelet portion and threaded on said threaded portion for cooperation with said guide portion in clamping said wall therebetween whereby said tiedown member may be positioned in selected locations along said channel.

3. The structure set forth in claim 2 wherein said guide portion has a maximum transverse dimension greater than the diameter of said threaded portion.

* * * * *

UNITED STATES PATENT OFFICE
CERTIFICATE OF CORRECTION

Patent No. 3,643,973      Dated February 22, 1972

Inventor(s) John A. Bott

It is certified that error appears in the above-identified patent and that said Letters Patent are hereby corrected as shown below:

Column 1, line 63, after "ribs", "5" should be -- 54 --.

Column 3, line 6 (Claim 2, line 9), before "threaded", "and" should be -- said --.

Signed and sealed this 11th day of July 1972.

(SEAL)
Attest:

EDWARD M. FLETCHER, JR.
Attesting Officer

ROBERT GOTTSCHALK
Commissioner of Patents